United States Patent [19]

Magdelain

[11] Patent Number: 4,689,059
[45] Date of Patent: Aug. 25, 1987

[54] CLEANER APPARATUS FOR TOXIC OR HAZARDOUS SUBSTANCES

[75] Inventor: Robert S. Magdelain, West Chester, Pa.

[73] Assignee: A/S Fisker & Nielsen, Copenhagen, Denmark

[21] Appl. No.: 903,251

[22] Filed: Sep. 3, 1986

Related U.S. Application Data

[62] Division of Ser. No. 542,713, Oct. 17, 1983, Pat. No. 4,650,505.

[51] Int. Cl.$^4$ .............................................. B01D 46/02
[52] U.S. Cl. ........................................ 55/382; 55/486; 55/528; 55/529; 55/DIG. 2
[58] Field of Search ................. 55/381, 382, 486, 491, 55/505, 514, 524, 528, 529, DIG. 2

[56] References Cited

U.S. PATENT DOCUMENTS

| | | | |
|---|---|---|---|
| 2,308,682 | 1/1943 | Fuge | 55/381 X |
| 2,630,190 | 3/1953 | Cordray | 55/381 |
| 3,190,059 | 6/1965 | Bauder et al. | 55/491 |
| 3,535,855 | 10/1970 | Howard et al. | 55/382 X |
| 4,116,648 | 9/1978 | Busch | 55/382 X |
| 4,164,400 | 8/1979 | Wald | 55/382 |
| 4,187,390 | 2/1980 | Gore | 55/486 X |
| 4,188,197 | 2/1980 | Amberkar et al. | 55/382 |
| 4,190,426 | 2/1980 | Ruschke | 55/528 X |

*Primary Examiner*—Kathleen J. Prunner
*Attorney, Agent, or Firm*—Burns, Doane, Swecker & Mathis

[57] ABSTRACT

The present invention relates to an apparatus for cleaning hazardous or toxic solid and liquid substances. The apparatus generally comprises a vacuum cleaner having a housing and an arrangement for drawing a fluid flow from an inlet to an outlet of the housing. A first filter is provided for separating and retaining both macro- and micro-particles of the substance entrained with the fluid flow. The first filter is arranged on a downstream side of the inlet of the housing and has a reservoir portion arranged below the inlet. Walls of the first filter permit outflow of substantially only vapors of the substance entrained in the fluid flow. A second filter for retaining the vapors is arranged fluidically between the first filter and the outlet. In a particularly preferred embodiment, the first filter includes a microporous filter membrane which is laminated to a fibrous support to provide a self-supporting unitary first filter for accomplishing the separation of the macro- and micro-particles of the substance.

9 Claims, 7 Drawing Figures

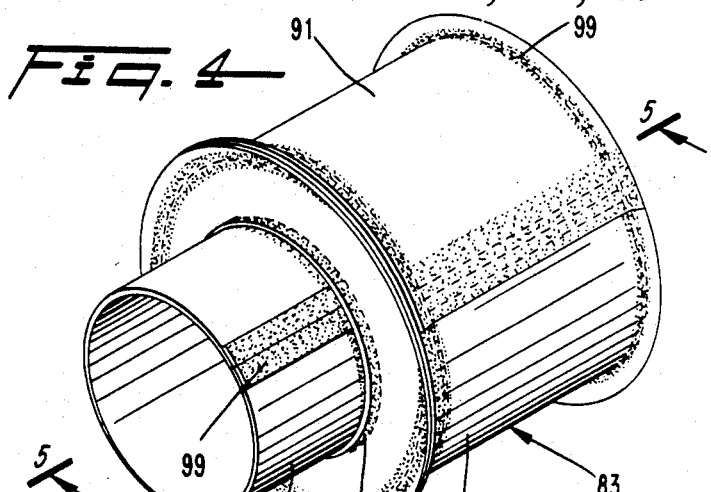
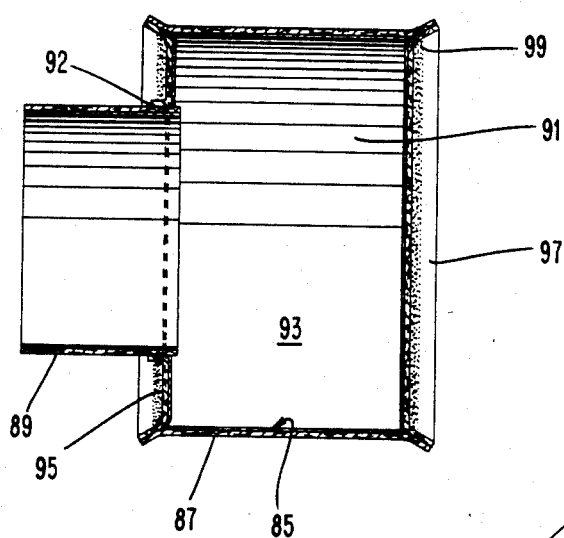
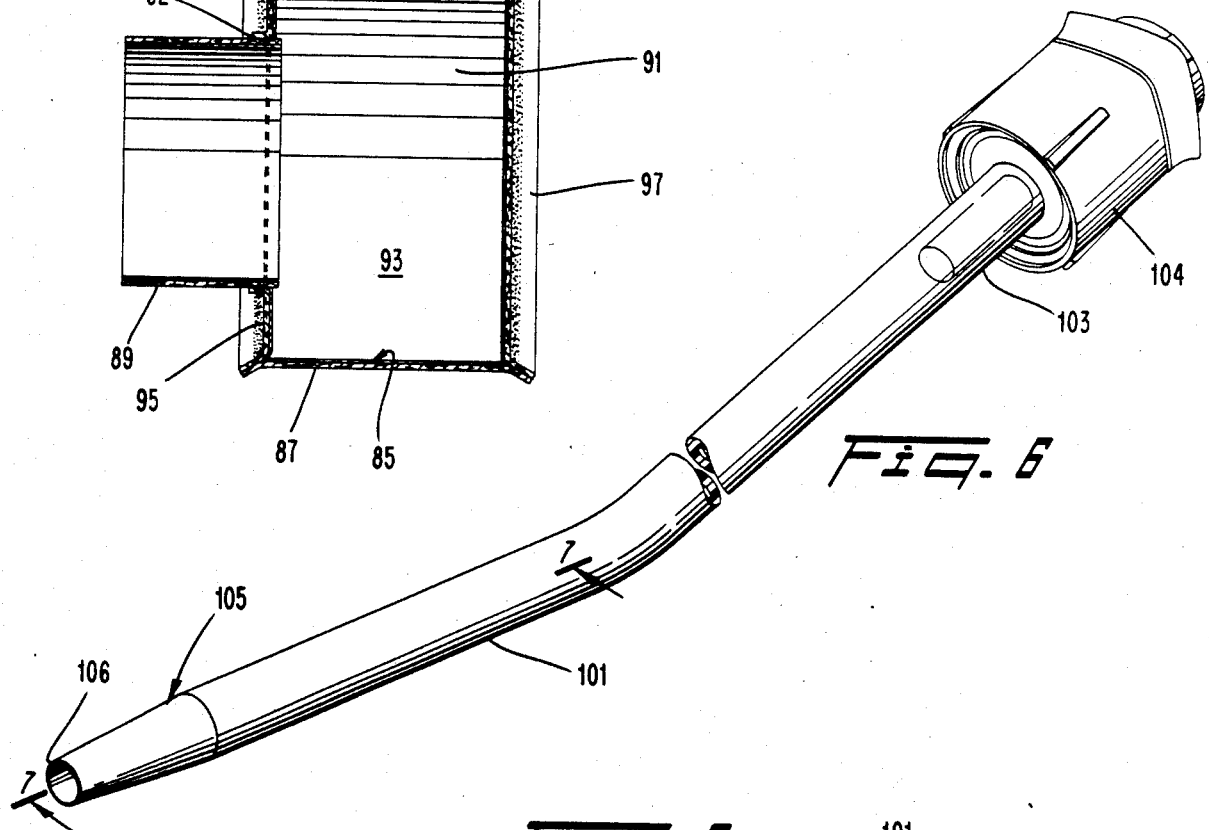
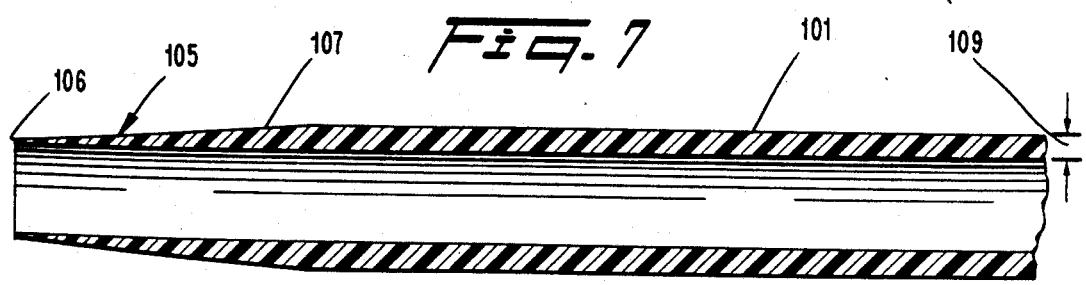

CLEANER APPARATUS FOR TOXIC OR HAZARDOUS SUBSTANCES

This application is a division of application Ser. No. 542,713, filed Oct. 17, 1983 now U.S. Pat. No. 4,650,505.

BACKGROUND AND SUMMARY OF THE PRESENT INVENTION

The present invention relates generally to an apparatus for removing and containing toxic or hazardous liquid or solid substances. More particularly, the present invention relates to a vacuum cleaner apparatus for removing spills of toxic or hazardous liquid and solid substances and for effectively retaining the macro- and micro-particles of the substance along with any vapor qenerated thereby.

The quick and efficient cleaning of spills of toxic or hazardous chemical substances is becoming increasingly important in both commercial and industrial applications. As more knowledge is gained of the potential hazards of certain substances, the impetus for providing an effective method for quickly and efficiently removing the dangerous substances has accelerated. Certain of these substances have been found particularly difficult to deal with since they contain both very small micro-particles and vapors which may be harmful to persons exposed to the substances. For example, the clean-up of spills of mercury or mercury compounds and various substances in the nuclear industry, such as depleted Uranium 238 (which may be used as weight in high performance military aircraft wings), residue from fuel rod manufacturing operations, fuel rod dust, and plutonium used in weapons manufacture, have posed particularly difficult problems for rapid and effective clean-up.

In addition, some applications using toxic or hazardous substances are on an extremely small scale. Accordingly, an apparatus which may be useful for large scale industrial applications may not be suitable for small scale clean-ups. For such small scale clean-ups, a small, relatively compact and easily movable cleaner apparatus must be provided. Such small scale applications may include, for example, the use of mercury or other toxic or hazardous substances by dentists or laboratory technicians. A further requirement for a cleaner for such small spills is that the cleaner be relatively inexpensive to purchase.

One known vacuum cleaner apparatus particularly adapted for recovering and containing mercury spills is manufactured by Nilfisk of America, Inc. of Malvern, Pa. This apparatus (which will be described in greater detail with reference to FIG. 1 of the drawings) includes a large stand-up housing with a suction motor arranged near an outlet of the housing to draw air and entrained substances in and through an inlet. A flexible hose is connected to the inlet of a centrifugal droplet separator which is connected to the housing inlet. The centrifugal droplet separator receives incoming fluid flow from the hose generally tangentially and swirls the fluid within the separator such that heavy particles, particularly of liquid mercury, drop to the bottom into a container in the separator. Thereafter, the air passes through the housing inlet and through a filter bag (usually of paper) arranged within the housing. Since the separator primarily only removes macro-particles of the liquid mercury or mercury compounds, an additional micro-filter disc is arranged downstream of the disposable bag. This filter disc is adapted to remove the micro-particles of the liquid mercury or mercury compounds and may comprise a glass fiber filter. Arranged downstream of the filter disc is an activated carbon filter which removes mercury vapor entrained in the fluid flow (i.e., the air flow) prior to exhausting the flowing fluid to the atmosphere. It should be noted that the elimination of vapors is particularly important in mercury and other substance which generate a substantial quantity of vapor at ambient pressure and even at less than ambient temperature.

The above-described mercury vacuum cleaner has certain disadvantages for smaller applications. In particular, the apparatus is particularly large and cumbersome to store and/or move close to the location of the spill. In addition, regular maintenance, such as cleaning, emptying, etc., must be performed on the various elements of the system. In particular, the centrifugal droplet separator must be periodically emptied along with the disposable bag within the housing. Also, periodic checks upon the efficiency of the glass fiber filter disc and the activated carbon filter must be undertaken. Moreover, the cost of such a large system, which is particularly useful in industrial applications, is likely to be too high for smaller spills of toxic substances such as those encountered in a laboratory or in a dental office.

Also known in the prior art are various vacuum cleaner arrangements including serially arranged filtration systems for ensuring a complete removal of unwanted particles, usually dust and other fine particles. Vacuum cleaner arrangements such as these with multiple filtration stages or elements are disclosed in U.S. Pat. Nos. 1,918,764 issued to Ljungquist; 3,046,718 issued to Ide et al; 3,308,609 issued to McCulloch et al; 3,621,640 issued to Ohno et al; 3,653,189 issued to Miyake et al; 3,665,683 issued to Schaefer; 3,835,626 issued to Miyake et al; 3,871,847 issued to Fish; and 4,229,193 issued to Miller. None of these devices is particularly adapted for removing and retaining toxic or hazardous substances particularly those substances which generate a high proportion of dangerous vapors which must be removed prior to exhausting air from the cleaner.

Accordingly, it is an object of the present invention to provide an improved apparatus for removing and retaining toxic or hazardous liquid or solid substances. More particularly, it is an object of the present invention to provide an apparatus for more effectively, efficiently and less expensively removing such substances.

Still a further object of the present invention is to provide an apparatus which is safe during operation and permits easy disposal of the toxic or hazardous substance in an acceptable manner. Yet a further object of the present invention is to provide such an apparatus in the form of a vacuum cleaner which is relatively small in size and relatively inexpensive to produce.

These objects and others are accomplished by the apparatus according to the present invention. The apparatus includes a container or housing having an inlet for the toxic or hazardous substances and an arrangement for creating suction pressure to draw the substance into the container entrained in a fluid flow created by the suction pressure. A first single filter retains both macro- and micro-particles of the substance while permitting outflow of substantially only vapors of the substance entrained in the fluid flow. The first filter is arranged downstream from and adjacent to the inlet. A second filter arranged downstream of the first unitary filter is adapted to directly receive the vapors from the first filter and to retain the vapors of the substance.

In a preferred embodiment, the first filter is secured to a downstream side of the inlet and includes a reservoir portion arranged below the inlet. The walls of the first filter permit outflow of substantially only vapors of the substance entrained within the fluid flow created by the suction arrangement. In a preferred embodiment, the first filter includes a microporous filter membrane laminated to a fibrous support structure. In a particularly preferred embodiment, the microporous membrane is comprised of polytetrafluoroethylene (PTFE) which may be readily formed into a membrane having an appropriately small pore size to retain the micro-particles of the toxic substance and is substantially chemically inert such that damage to the membrane by contact with the toxic or hazardous substance is avoided and/or minimized. Moreover, a microporous membrane of polytetrafluoroethylene does not require an unacceptably large pressure differential to draw fluid, particularly gases, through the membrane. Therefore, an increase in the power required by the suction motor is not necessary to obtain the advantages of the present invention.

Further in the preferred embodiment of the present invention, the first filter element includes an inlet portion adapted to surround an inlet duct of a vacuum cleaner having a suction motor for drawing in the substance. An enlarged portion of the filter element having walls surrounding an internal space is sealingly connected to a downstream end of the inlet portion. At least an inside surface of the walls include the microporous membrane which retains the macro- and micro-particles of the substance and permits passage of substantially only gaseous vapors of the substance through the membrane. The inlet portion and the enlarged portion are preferably comprised of the same material with the enlarged portion being sealingly connected to the inlet portion by a sewn seam over which a suitable sealant is applied to prevent passage of the air therethrough. Further, the enlarged portion is preferably in the form of a hollow cylinder coaxial with the circular inlet portion.

In accordance with still a further aspect of the present invention, a hose member adapted for connection to the inlet includes walls with a smooth continuous internal surface having a first, generally constant thickness. The hose member has a nozzle portion at a second end thereof with the nozzle portion having a second thickness substantially less than the first thickness at least at a free end of the nozzle. Preferably, the entire hose and the nozzle portion are one piece comprised of the same material, such as a plastic material which is resistant to mercury and other toxic substances. Further, the reduced thickness of the nozzle portion provides a highly flexible free end for the nozzle.

BRIEF DESCRIPTION OF THE DRAWINGS

A preferred embodiment of the present invention will be described in greater detail with reference to the accompanying drawings, wherein like members bear like reference numerals, and wherein:

FIG. 4 is a perspective view of the first filter element of FIG. 3;

FIG. 5 is a cross-sectional view of a filter element taken along the line 5—5 in FIG. 4;

FIG. 6 is a view of an improved hose member according to the present invention; and FIG. 7 is a cross-sectional view of the hose member taken along the line 7—7 in FIG. 6.

DETAILED DESCRIPTION OF THE PREFERRED EMBODIMENT

Figure 1:
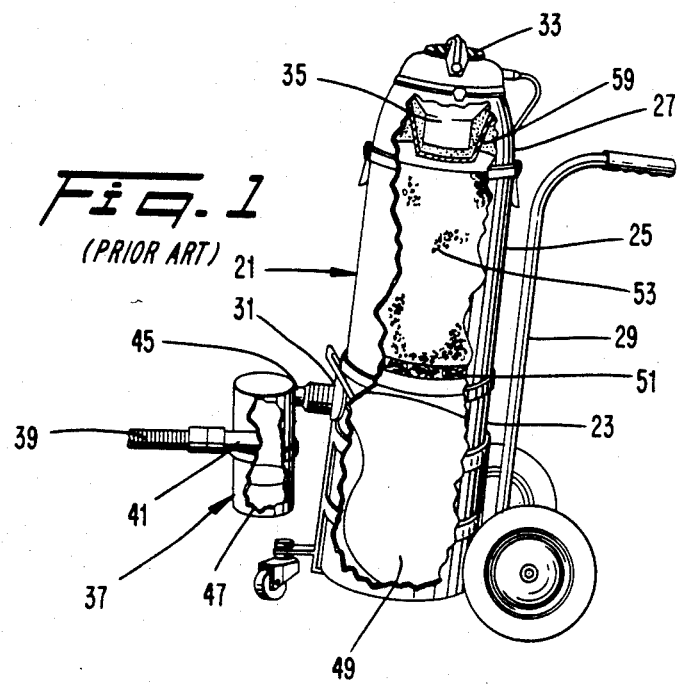
FIG. 1 is a perspective view partially in cross-section of a prior art mercury vacuum cleaner.

With reference to FIG. 1, a prior art vacuum cleaner for liquid mercury and mercury compounds includes a housing or container 21 having first, second and third sections 23, 25, 27, respectively. The housing 21 is adapted to be received in a suitable wheeled base support 29. The housing or container 21 includes an inlet 31, an outlet 33 and a suction motor 35 arranged within the third section 27. The suction motor 35 is adapted to draw air from the inlet 31 to the outlet 33. Secured to an upstream end of the inlet 31 is a centrifugal droplet separator 37 for removing macro-particles of liquid mercury or mercury compounds.

A suction hose 39 is connected to an inlet 41 of the centrifugal droplet separator 37 to draw the liquid mercury or mercury compounds therein. The centrifugal droplet separator 37 operates, in a known manner, by admitting the fluid tangentially into the separator housing and swirling the fluid toward an outlet 45 of the separator 37 which outlet 45 is connected to the inlet 31 of the container 21. The swirling action of the fluid within the separator 37 causes heavier particles to drop downwardly toward a collection container 47 arranged in a lower portion of the separator 37. The container 47 is removable to permit disposal of the particles in a proper manner.

A bag-like filter 49 of paper or another suitable material is arranged within the first section 23 of the housing 21. The filter 49 merely serves to eliminate some additional particles of the substance which did not drop out in the separator 37. However, this filter bag 49 is not adapted to remove small micro-particles of liquid mercury or mercury compounds. Accordingly, arranged within the second section 25 of the container 21 is a highly compressed, glass fiber filter disc 51. Such a disc 51 is often used for filtering in nuclear applications. The filter disc 51 is adapted to remove micro-particles of the incoming substance which pass through both the centrifugal droplet separator 37 and the bag filter 49. Arranged above the filter disc 51 is an activated carbon filter 53.

Figure 2:
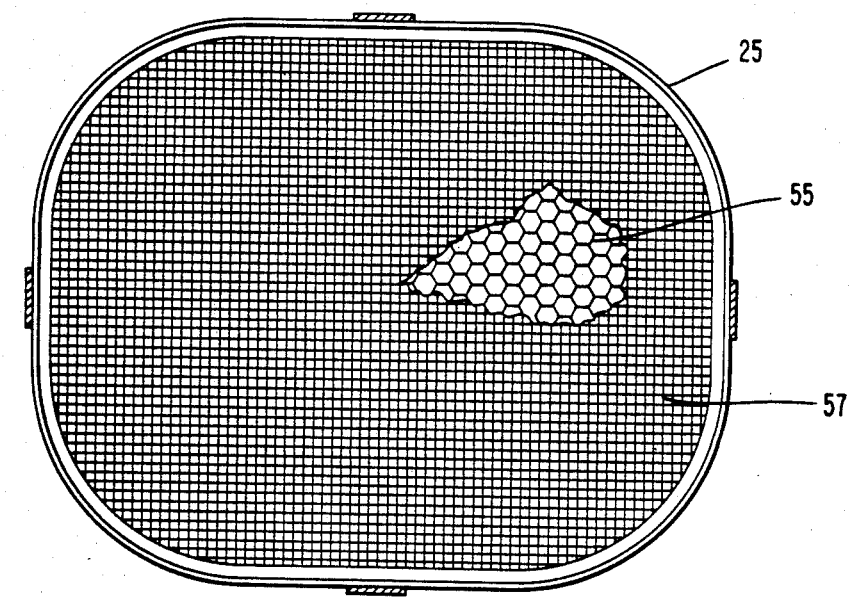
FIG. 2 is an end view partially in section of an activated carbon filter used in a cleaner apparatus of the present invention.

The activated carbon filter 53 may be of any suitable commercial design. One carbon filter found particularly suitable for use in the mercury vacuum cleaner illustrated in FIG. 1 is manufactured by Machine Control Ltd. of West Sussex, England. The carbon filter 53 is arranged downstream of the filter disc 51 within the second section 25 of the housing 21 and includes a honeycomb structure 55 (FIG. 2) comprised of layers of honeycomb cells positioned assymetrically to present a convoluted flow path for fluid. The honeycomb structure 55 is filled with activated carbon (which is retained by a screen 57) for adsorbing vapors of the hazardous or toxic substance being cleaned up. It should be noted that, due in part to the relatively short dwell time of the fluid flow in the carbon filter 53, this filter 53 cannot absorb micro-particles of the substance. Accordingly, the use of the filter disc 51 to remove these micro-particles is required to prevent distribution of the particles to the air through the housing outlet 33. The carbon filter 53 is particularly effective, however, in adsorbing toxic or hazardous vapors.

An additional micro filter 59 comprised of a suitable fabric is preferably arranged around the motor 35 to prevent contamination thereof before passing the cleaned air to the atmosphere through the outlet 33 of the housing 21. It should be noted that suitable seals and clamping arrangements are provided for connecting the various sections and elements of the vacuum cleaner to each other in a fluid tight manner.

The prior art mercury vacuum cleaner as shown in FIG. 1 has proved successful particularly for large industrial application. However, due to the size and required maintenance of the prior art vacuum cleaner, this cleaner has not met with wide commercial success for cleaning up toxic or hazardous substances in smaller commercial establishments such as laboratories and/or dental offices. Further, due to the utilization of the various filtering apparatus, particularly the high density glass fiber disc 51, the cost of the prior art cleaner is considerably more than small users are willing to pay.

Figure 3:
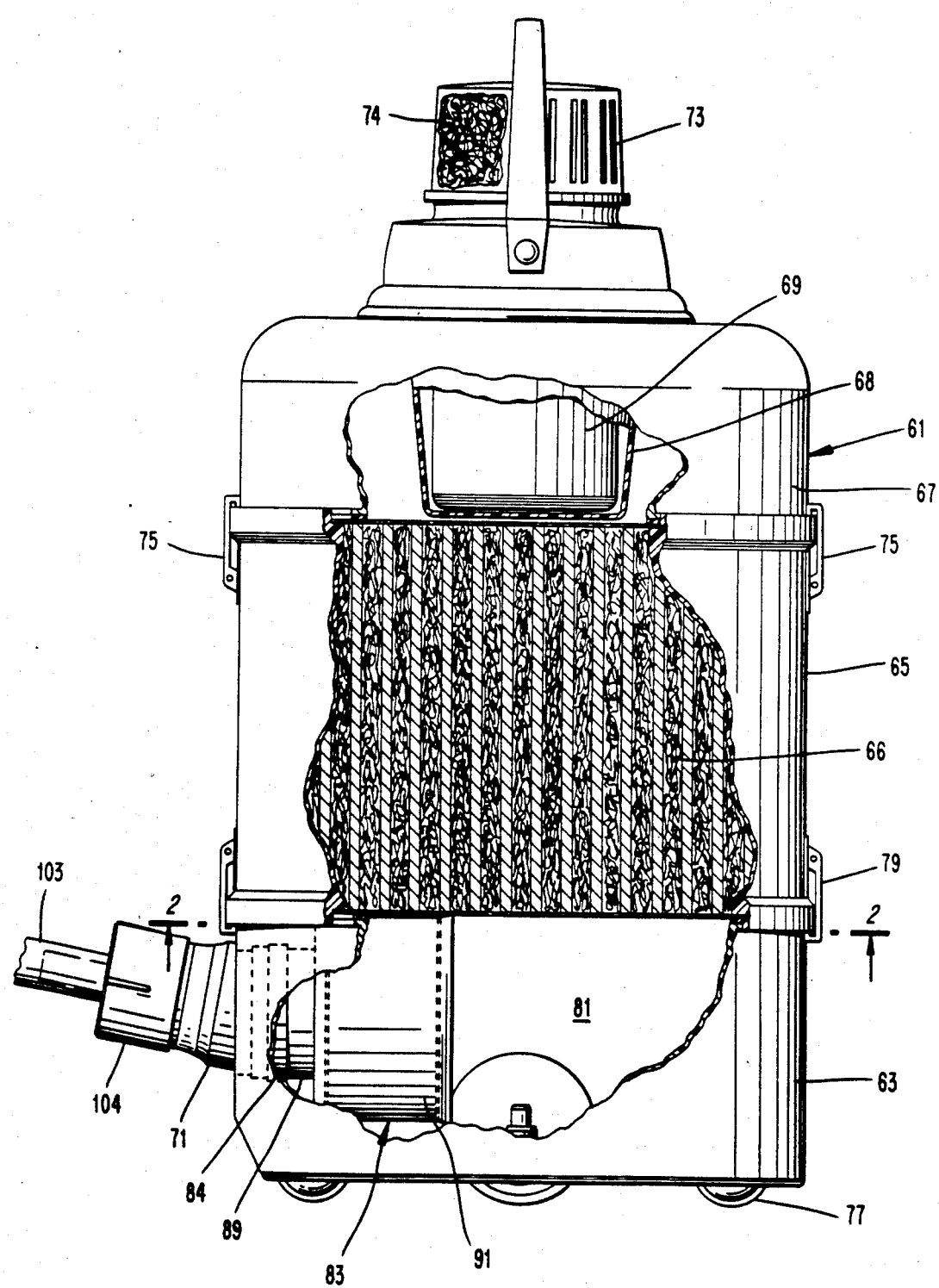
FIG. 3 is a partial cross-sectional view of the cleaner apparatus according to the present invention.

The present invention provides a greatly simplified, and hence reduced cost, cleaner apparatus for removing and retaining toxic or hazardous substances for disposal or re-use. With reference to FIG. 3, the cleaner apparatus includes a housing or container 61 comprised of first, second and third sections 63, 65 and 67, respectively. The third section 67 includes a motor 69 for creating suction pressure to draw air and particles of the toxic or hazardous substance entrained therein from an inlet 71 connected to the first section 63 upwardly through the second section 65, the third section 67 and outwardly through an outlet 73. The motor 69 may be of any suitable commercial design such as a Nilfisk Type GSE manufactured by Nilfisk of America, Inc. The various sections of the container 61 are preferably comprised of a suitable high-impact resistant and chemically inert plastic material. A micro filter 68 (similar to the filter 59 in FIG. 1) is preferably provided around the motor 69. It may also be desirable when utilizing the cleaner apparatus for certain hazardous or toxic substances, for example, in nuclear applications, to employ an absolute filter element 74 downstream of the motor outlet to further ensure that clean air is exhausted to the atmosphere.

The second section 65 of the housing 61 includes an activated carbon filter 66 for removing hazardous vapors given off by the substance to be cleaned up. The activated carbon filter 66 is preferably similar to that utilized in the prior art and discussed with reference to FIGS. 1 and 2 above. The carbon filter 66 is particularly efficient in removing hazardous vapors entrained in the airflow drawn by the motor 69 through adsorption of the vapors onto the surface of the carbon. It should be noted that the present invention does not include the high density filter disc 51 as in the prior art (FIG. 1). The activated carbon filter 66 is generally designed for a shelf life of approximately two years. However, regular periodic checks of the cleaner's exhaust for toxic substances should be undertaken to ensure proper operation of the carbon filter 66 and the cleaner apparatus. The second and third sections of the housing 61 are secured together by suitable clamps 75 which act on suitable seals arranged on the abutting surfaces of the two housing sections to prevent leakage of fluid from the housing 61.

The first section 63 of the housing 61 is arranged on wheels 77 to facilitate movement of the entire cleaner apparatus. The first section 63 is sealingly secured to a lower end of the second section 65 by suitable clamps 79 and seals (not shown). An interior space 81 of the first section 63 is partially filled with a single, one-piece or unitary filter element 83 operable to retain both macro- and micro-particles of the substance being cleaned while permitting outflow of substantially only vapors of the substance entrained within the moving fluid flow of air created by the motor 69. In other words, the single filter element 83 according to the present invention itself accomplishes the several functions of the separate centrifugal droplet separator 37, the filter bag 49 and the glass fiber filter disc 51 of the prior art illustrated in FIG. 1. The toxic vapors and air flowing out of the filter element 83 are directly received by the carbon filter 66 without any additional filtration. In the preferred embodiment, a portion of the filter element 83 is closely adjacent a lower end of the carbon filter 66.

The arrangement according to the present invention both reduces the size of the overall cleaner apparatus and substantially reduces the cost of manufacturing the cleaner apparatus. Moreover, the elimination of the three filtering elements of the prior art and the substitution by the single unitary filter element 83 according to the present invention reduces the cost, weight and size of the cleaner apparatus according to the present invention. In a preferred embodiment, a vacuum pressure of approximately 4–5 inches of mercury has been found suitable. This pressure is sufficient to pick up even heavy particles, such as liquid mercury, and also to provide sufficient dwell time to effectively remove toxic vapors in the carbon filter 66. Moreover, it will not draw the solid mercury through the filter element 83. In this connection, a pressure differential in excess of 35 inches of mercury has been found necessary to draw solid mercury through that filter element 83.

There are numerous physical and chemical properties which the filter element 83 must possess in order to accomplish the desired filtration of both macro- and micro-particles of the substance. In the preferred embodiment and with reference to FIGS. 4 and 5, the filter element 83 includes a microporous filter membrane 85 arranged at least on an inside surface of the filter element 83. The microporous membrane 85 must have a sufficiently small pore size to prohibit passage of very small, i.e., micro, particles of the toxic or hazardous substance. Further, the composition of the membrane 85 must be such that the material is particularly inert chemically to avoid reactions with the toxic substances which the membrane must contact and filter. Moreover, the membrane 85 must have a structure which permits passage of a reasonable quantity of air without requiring a high pressure differential. The resulting lower volume of air flow ensures sufficient dwell time in the carbon filter 66.

In a particularly preferred embodiment, polytetrafluoroethylene (PTFE) has been found to be a particularly suitable material for use as the microporous membrane 85 of the filter element 83. PTFE has been suggested for use (1) as a filter bag for use in filtering carbon black particles (U.S. Pat. No. 3,957,938); (2) as a fiber batt for removing dispersoids (U.S. Pat. No. 3,986,851), and (3) as a coating on glass fibers of a filter (U.S. Pat. No.

4,370,376) but has not heretofor been utilized for the purposes of the present invention.

Moreover, the filter element 83 must possess sufficient structural integrity both to withstand the pressure differential occasioned by the suction motor 69 and to retain, without rupture, quantities of the toxic substance which may be particularly heavy as in the case of liquid mercury. In order to provide the required structural integrity, the microporous membrane 85 is preferably laminated to a support material 87 which does not interfere substantially with the passage of vapors through the membrane 85, such as polyester felt. The polyester felt does not interfere with the filtration required by the microporous member 85 since the polyester felt permits relatively free passage of toxic vapors and air and the membrane 85 is arranged on the inside, or downstream side, of the filter element 83. However, the support material 87 must provide sufficient structural integrity to withstand the suction pressure and the weight of the toxic substance to be retained within the filter element 83.

A material which has been found particularly suitable for use in the cleaner apparatus according to the present invention is marketed under the name of Gore-Tex ® and is manufactured by W. L. Gore and Associates, Inc. The Gore-Tex ® membranes comprise polyester fibers with a PTFE membrane laminated to one side surface. Gore-Tex ® membranes have been used for filtration of various substances. For example, filters made from Gore-Tex ® are asserted to be useful for dust or production collection in the following industries: metals (lead fumes, alumina, rare metal recovery); chemicals (PVC, urea, fertilizers, herbicides, pesticides); minerals (cement, gymsum, soda ash, rock dust, clay dust); and food (food sugar, starch, cake mixes, grain dust). This general type of membrane filter has also been used as a final particulate filter in a vacuum cleaner for certain toxic or hazardous substances such as, photocopier toner, citrus spores or asbestos. However, such a filter has not been utilized in series with a vapor filter. Accordingly, the new and unexpectedly beneficial results obtained from such a use in accordance with the present invention have not been suggested.

Again with reference to FIGS. 4 and 5, the filter element 83, according to the present invention, preferably includes a generally cylindrical inlet portion 89 adapted to surround an inlet duct (FIG. 3) provided in the first section 63 of the housing 61. The generally tubular inlet section 89 is securely attached about the intake duct preferably by a suitable clamp member 84. In this way, all the material flowing through the inlet duct into the interior of the housing 61 is forced to pass into the interior space of the filter element 83 and impinge against the microporous membrane 85.

The filter element 83 further includes an enlarged portion 91 sealingly connected to the inlet portion 89. In a preferred embodiment, the enlarged portion comprises a generally cylindrical element having an opening 92 in one end wall 95 to receive the filter inlet portion 89. The cylindrically enlarged portion 91 is preferably coaxial with the generally cylindrical inlet portion 89. In this way, a lower portion 93 of the enlarged portion 91 serves as a holding reservoir for large particles of the incoming substance. The particles tend to collect in the lower portion 93 since the lower portion 93 extends below the level of the inlet duct and the inlet portion 89 of the filter element 83. Further, by providing the cylindrical configuration for the enlarged portion 91, a maximum surface area of the microporous filter membrane 85 is obtained with a minimum amount of material. Further, the cylindrical configuration avoids the existence of corners in which particles could become trapped and disturb the filtration process.

In a preferred form of construction of the filter element 83, both the inlet portion 89 and the enlarged portion 91 are made of the same material comprising an internal microporous membrane 85 laminated to the fibrous support structure 87. In particular, the filter element 83 is comprised of four material strips. The first strip comprises the inlet portion 89, a second strip comprises the cylindrical wall of the enlarged portion 91 while a third strip forms the first end wall 95 (with the opening 92) of the enlarged portion 91 and a fourth strip constitutes a second end wall 97 of the enlarged portion 91. Each of the various material strips are sealed to one another along seams (generally indicated by reference numeral 99) which are sewn in a conventional manner. Thereafter, the seams 99 of the filter element 83 are fully sealed by applying a suitable sealant, such as a silicon compound, which is substantially impervious to airflow therethrough. In this way, it is further ensured that all of the fluid flow which passes directly to the activated carbon filter 66 has first passed through the microporous member 85 to remove both the macro- and micro-particles of the particular substance to be cleaned.

As noted previously, due in part to the fluid dwell time, the activated carbon filter 66 is not adapted to remove even small micro-particles of the substance. Accordingly, it is essential that the fluid flow passing through the activated carbon filter 66 has been substantially cleaned of all macro- and micro-particles. The single, one piece filter element 83 according to the present invention is effective in removing both of these particle sizes. In this way, the activated carbon filter 66 can effectively remove the vaporous component of the substance entrained with the airflow passing through the cleaner apparatus.

As can be appreciated, the filter element 83 according to the present invention is relatively simple and inexpensive to construct. Further, the particular configuration of the filter element 83 with a reservoir portion 93 below the inlet portion 89 ensures that various particles of material deposited therein can be safely removed. In particular, after cleaning a spill, the clamps 79 securing the second housing section 65 to the first housing section 63 are released to expose the filter element 83 within the first section 63. The filter element 83 can easily be removed without risk of spilling the contents therein due to the downwardly extending reservoir portion 93 and, after turning the filter element 83 to a vertical orientation the entire enlarged portion 91 retains the substance. Thereafter, the entire filter element 83 can be placed in a suitable receptacle for disposal in accordance with government regulations. Once again, by providing a single unitary filter element 83 for removing both macro- and micro-particles of the toxic substance, clean-up and disposal of the toxic substance is greatly facilitated over the prior art arrangement of three individual filter apparatus.

In accordance with a further aspect of the present invention, a special hose member 101 (FIG. 6) is particularly adapted for use for picking up liquid mercury. The hose member 101 has a first end 103 connected to a suitable fitting 104 which is adapted to sealingly engage the inlet 71 of the lower section 63 of the container 61. The connector 104 is of any suitable design, including, for example, a bayonet-type connection, and will not be described in further detail. The hose member 101 has internal walls with a smooth continuous surface to facilitate a flow of the mercury or other toxic substance therethrough. In addition, the material from which the hose member 101 is made must be collapse-proof with a high resistance to mercury and other toxic substances such that substantially no mercury adheres to the internal walls of the hose member. A material found to be particularly suitable for use as the hose member 101 is manufactured by Norton Industries, under the name Tygon.

A second end of the hose member 101 includes a nozzle portion 105. In the preferred embodiment, the hose member 101 and the nozzle portion 105 are made from the same continuous seamless tube. An outer wall 107 of the tube is tapered in the nozzle portion 105 such that a free end 106 of the nozzle portion 105 is extremely thin. In particular, the free end 106 should be so thin as to be highly flexible and preferably as thin as possible while still retaining the integrity of the continuous tube in the nozzle portion 105. As can be seen in FIG. 7, the tapered outer wall 107 substantially reduces the thickness of the nozzle portion, and particularly the free end 106, over the thickness 109 of the remaining portion of the hose member 101. The extremely thin, highly flexible end 106 on the nozzle portion 105 is particularly adapted for use in picking up liquid mercury. The use of a thinner wall at the nozzle end of a hose in connection with the prior art apparatus of FIG. 1 was found to be advantageous in avoiding the break up of liquid mercury into smaller particles by the edges of the nozzle prior to being drawn within the hose by the suction created by the motor of the vacuum cleaner apparatus. Such break-up of mercury is undesirable and further increases the risk of contamination to the surroundings from the spill. The highly flexible end 106 of the single piece continuous tube hose member 101 according to the present invention thus provides the advantage of improved pick-up of liquid mercury and other compounds in the context of a hose member having a smooth flow and a resistance to adherence of toxic substances.

During the operation of the cleaner apparatus according to the present invention, the motor 69 is turned on to produce a suction pressure through the apparatus. The free end 106 of the nozzle portion 105 is brought close to the substance such that the suction pressure draws in the substance entrained within the airflow into the hose member 101. The fluid flow, with entrained particles therein, passes through the housing inlet 71 and the inlet duct into the interior space of the enlarged portion 91 of the first filter element 83. In the first filter element 83, the macro- and micro-particles of the substance are removed by filtration performed by the microporous filter membrane 85 on the interior surface of the filter element 83. Gaseous vapors of the substance along with air are drawn through the microporous membrane 85 and the fibrous support 87 therearound and pass upwardly through the activated carbon filter 66. In the carbon filter 66, the gaseous vapors of the substance are adsorbed on the carbon therein and substantially clean air passes upwardly through the micro filter 68, the motor 69 and through the additional filter 74 (if provided) to the outlet 73.

Once again, it is noted that the present invention substantially reduces the components and hence the expense of the prior art toxic substance vacuum cleaners apparatus. This reduction in equipment and cost is accomplished without a reduction in the cleansing efficiency of the cleaner apparatus. In particular, all of the volatile components of the toxic substance are effectively removed before returning the air to the atmosphere. It is the particular arrangement of the serial filtration units, with the first filter element 83 removing both macro- and micro-particles of substance while the second carbon filter 66 removes gaseous vapors of the substance, which arrangement produces the new and unexpected results according to the present invention.

The principles, preferred embodiment and mode of operation of the present invention have been described in the foregoing specification. However, the invention which is intended to be protected is not to be construed as limited to the particular embodiments disclosed. The embodiments are to be regarded as illustrative rather than restrictive. Variations and changes may be made by others without departing from the spirit of the present invention. Accordingly, it is expressly intended that all such variations and changes which fall within the spirit and scope of the present invention as defined in the claims be embraced thereby.

What is claimed is:

1. An apparatus for effecting partial filtration of toxic or hazardous liquid and solid substances, comprising:
   an inlet portion adapted to surround an inlet duct of a vacuum cleaner having suction means for drawing in the substance;
   an enlarged portion having wall means for surrounding an internal space, said wall means being sealingly connected to and downstream of said inlet portion;
   said wall means including a microporous membrane completely surrounding an inside surface adjacent the internal space, said membrane retaining both macro- and micro-particles of the substance and permitting passage of substantially only gaseous vapors of the substance.

2. The apparatus of claim 1, wherein said wall means is sufficiently strong to withstand the suction pressure generated by said suction means and to retain the substance in the enlarged portion.

3. The apparatus of claim 1, wherein the inlet portion and the enlarged portion are comprised of the same material.

4. The apparatus of claim 1, wherein the enlarged portion is sealingly connected to the inlet portion by a sewn seam, and further comprising sealing means for sealing said seam to prevent passage of air through the seam.

5. The apparatus of claim 4, wherein the sealing means comprises a silicon compound.

6. The apparatus of claim 1, wherein the microporous membrane is comprised of polytetrafluoroethylene.

7. The apparatus of claim 1, further comprising support means for mechanically stabilizing said membrane, said support means being integral with said membrane.

8. The apparatus of claim 7, wherein the support means comprises polyester fibers laminated to said membrane.

9. The apparatus of claim 1, wherein at least an open end of the inlet is generally circular, the enlarged portion being a hollow cylinder coaxial with at least the open end of the inlet portion.

* * * * *